(12) United States Patent
Rajagopalan

(10) Patent No.: US 12,533,349 B2
(45) Date of Patent: Jan. 27, 2026

(54) DRUG FORMULATIONS FOR RESERVOIR-BASED DELIVERY

(71) Applicant: Medtronic, Inc., Minneapolis, MN (US)

(72) Inventor: Chandrasekhar R. Rajagopalan, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 756 days.

(21) Appl. No.: 17/797,854

(22) PCT Filed: Feb. 2, 2021

(86) PCT No.: PCT/US2021/016124
§ 371 (c)(1),
(2) Date: Aug. 5, 2022

(87) PCT Pub. No.: WO2021/158496
PCT Pub. Date: Aug. 12, 2021

(65) Prior Publication Data
US 2023/0070328 A1 Mar. 9, 2023

Related U.S. Application Data

(60) Provisional application No. 62/971,507, filed on Feb. 7, 2020.

(51) Int. Cl.
*A61K 31/445* (2006.01)
*A61K 9/00* (2006.01)
(Continued)

(52) U.S. Cl.
CPC .......... *A61K 31/445* (2013.01); *A61K 9/0024* (2013.01); *A61K 9/08* (2013.01); *A61M 5/14244* (2013.01); *G01N 33/15* (2013.01)

(58) Field of Classification Search
CPC ...... A61K 31/445; A61K 9/0024; A61K 9/08; A61K 47/12; A61K 9/0019;
(Continued)

(56) References Cited

U.S. PATENT DOCUMENTS

2017/0327296 A1    11/2017    Ettlin et al.

FOREIGN PATENT DOCUMENTS

| WO | 2006/038110 | 4/2006 |
| WO | 2021/158496 | 8/2021 |
| WO | 2021/167786 | 8/2021 |

OTHER PUBLICATIONS

Shah et al, "pH-Dependent solubility and dissolution of bupivacaine and its relevance to the formulation of a controlled release system" Journal of Controlled Release vol. 23, Issue 3, Mar. 1993, pp. 261-270 (Year: 1993).*

(Continued)

*Primary Examiner* — Dennis White
(74) *Attorney, Agent, or Firm* — Draft Masters IP, LLC

(57) ABSTRACT

A method for formulating a drug for use with a medical device, such as a reservoir-based delivery device, includes (i) determining that an ingredient of a drug formulation has a differential Hansen Solubility Parameter (HSP) value for a component of a medical device of less than 10; (ii) identifying a range of pH at which the ingredient has a high solubility in an aqueous solution; and (iii) preparing an aqueous drug formulation comprising the ingredient for use with the medical device. The formulation has a pH within the identified range, provided that the pH is compatible with the medical device. The ingredient is present in the formulation at a concentration below the maximum concentration for solubility at the pH of the formulation.

18 Claims, 2 Drawing Sheets

(51) Int. Cl.
*A61K 9/08* (2006.01)
*A61M 5/142* (2006.01)
*G01N 33/15* (2006.01)

(58) Field of Classification Search
CPC .... A61M 5/14244; A61M 5/28; A61M 39/02; G01N 33/15
See application file for complete search history.

(56) References Cited

OTHER PUBLICATIONS

Fang et al, "Model Protein Adsorption on Polymers Explained by Hansen Solubility Parameters", 2019, Journal of Pharmaceutical Sciences 108 (2019) 187-192. (Year: 2019).*

Hildebrand et al, "Stability, Compatibility, and Safety of Intrathecal Bupivacaine Administered Chronically via an Implantable Delivery System" The Clinical Journal of Pain, 2001, 17:239-244. (Year: 2001).*

Kitak et al., "Determination of Solubility Parameters of Ibuprofen and Ibuprofen Lysinate" Molecules, 2015; 20: 21549-68.

International Search Report and Written Opinion for PCT/US2021/016124, mailed May 21, 2021; 12 pages.

Hildebrand et al., "Stability, compatibility, and safety of intrathecal bupivacaine administered chronically via an implantable delivery system" Clin J Pain, Sep. 2001; 17(3):239-44.

Shah et al., "pH-Dependent solubility and dissolution of bupivacaine and its relevance to the formulation of a controlled release system" J Controlled Release, Mar. 1993; 23(3):261-270.

Zengerle et al., "Solvent Bonding of a Drug Delivery Device by Using Hansen Solubility Parameters" Proceedings of the 8th International Conference on Multi-Material Micro Manufacture, Jan. 1, 2011; Singapore. pp. 38-41.

International Search Report and Written Opinion for PCT/US2021/016289, mailed May 14, 2021; 8 pages.

\* cited by examiner

DRUG FORMULATIONS FOR RESERVOIR-BASED DELIVERY

FIELD

The present technology is generally related to drug delivery formulations for use with reservoir-based delivery devices, such as ambulatory or implantable infusion devices.

BACKGROUND

In many cases, existing injectable drug formulations configured for intravenous or intramuscular or intrathecal delivery are adopted for delivery using ambulatory or implantable infusion devices. While such practices are generally safe for patients, the existing drug formulations may not be fully compatible with the reservoir-based infusion devices. For example, the drugs may be taken up by one or more components of the reservoir-based infusion devices or may react with one or more components of the reservoir-based infusion devices.

SUMMARY

The present disclosure describes methods for designing drug formulations having improved compatibility with reservoir-based delivery device. The present disclosure also describes, as an example, a bupivacaine formulation that may be compatible with reservoir-based delivery devices.

In one aspect, the present disclosure a method for formulating a drug for use with a medical device, such as a reservoir-based delivery. The method includes (i) determining that the difference between the Hansen Solubility Parameter (HSP) values of the formulation ingredient and a formulation contacting component of a medical device of less than 10; (ii) identifying a range of pH at which the ingredient has a high solubility in an aqueous solution; and (iii) preparing an aqueous drug formulation comprising the ingredient for use with the medical device. The formulation has a pH within the identified range, provided that the pH is compatible with the medical device. The ingredient is present in the formulation at a concentration below the maximum concentration for solubility at the pH of the formulation.

The concentration of the ingredient in the formulation relative to the maximum concentration for solubility at the pH of the formulation may be proportional to the differential HSP value. For example, the lower the HSP value, the lower the ingredient concentration.

In some embodiments, the concentration of the ingredient, such as the drug, in the formulation is less than 50% of the maximum concentration for solubility at the pH of the formulation. For example, the concentration of the drug in the formulation is less than 25% of the maximum concentration for solubility at the pH of the formulation.

The method may further include determining whether the ingredient may have a potential for physicochemical interactions with the component of the reservoir-based delivery device. If the ingredient is determined to have potential for interaction with the component of the reservoir-based delivery device, the concentration of the ingredient in the formulation may be further lowered.

In another aspect, the disclosure provides a liquid bupivacaine formulation for use with a reservoir-based delivery device. The formulation includes water and bupivacaine at a concentration between 1 mg/ml and 15 mg/ml. The formulation has a pH between 4 and 5. The formulation may contain sodium chloride or other such excipients.

In another aspect, the disclosure provides a system that includes (i) a reservoir-based delivery device comprising a reservoir; and (ii) a liquid bupivacaine formulation disposed in the reservoir. The liquid bupivacaine formulation includes water and bupivacaine at a concentration between 1 mg/ml and 15 mg/ml. The formulation has a pH between 4 and 5. The formulation may contain sodium chloride or other such excipients.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
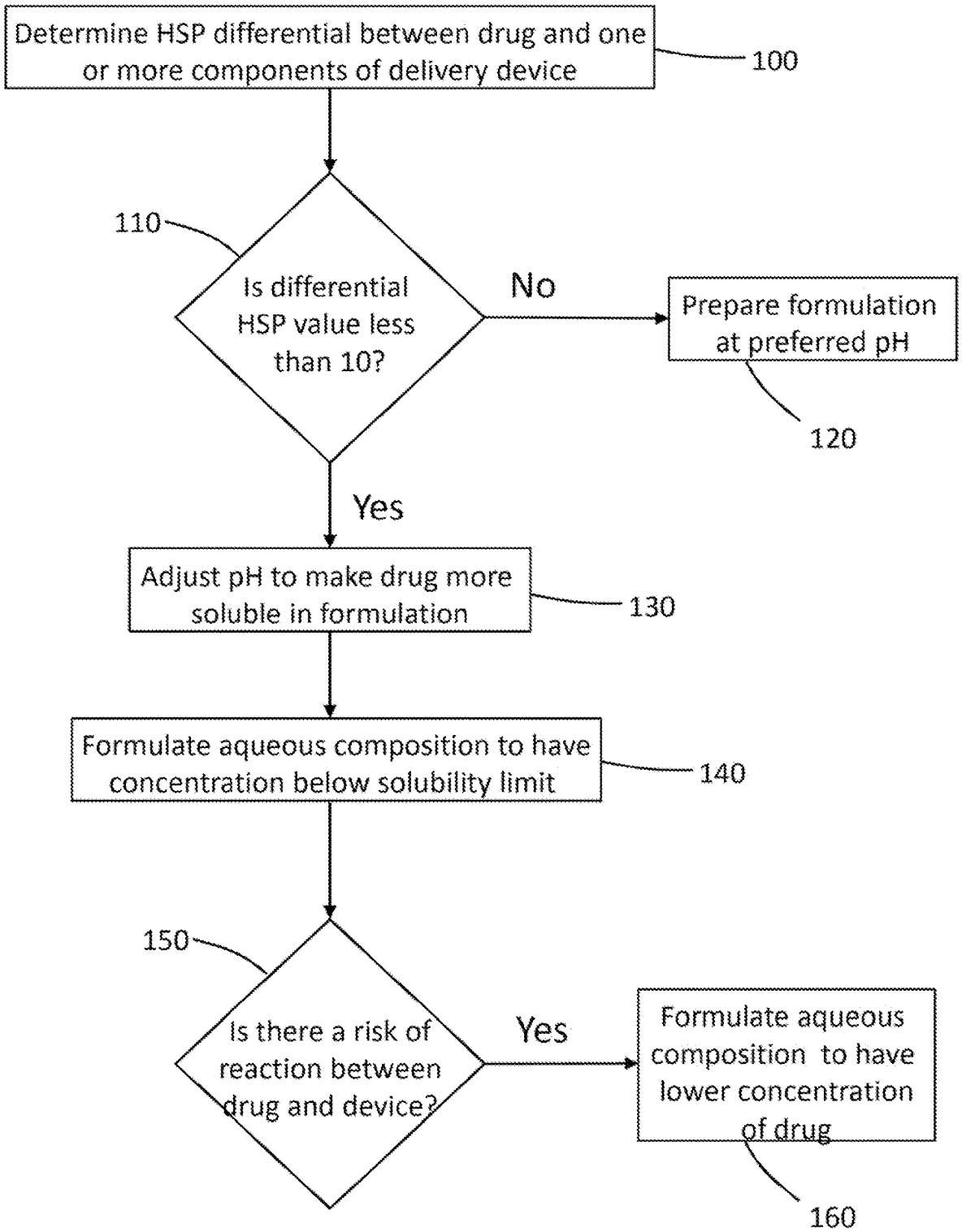
FIG. 1 is a flow diagram that illustrates a method for preparing a drug formulation for use with a reservoir-based delivery device.

The present disclosure describes methods for designing drug formulations having improved compatibility with reservoir-based delivery device. The present disclosure also describes a bupivacaine formulation that may be compatible with reservoir-based delivery devices.

For purposes of the present disclosure "reservoir-based delivery devices" are drug delivery devices that are designed to store a certain volume of a drug formulation in a reservoir and are configured to deliver the drug formulation over time to a target location of a patient. The reservoir-based delivery devices may be ambulatory or implantable. The reservoir-based delivery devices may be fixed-rate delivery devices or variable or programmable rate delivery devices. An example of a reservoir-based delivery device that is a variable or programmable rate delivery device is Medtronic, Inc.'s SynchroMed® II implantable infusion device.

For purposes of the present disclosure, reference to a compound will be understood to include reference to the compound, salts of the compound, solvates of the compound, and polymorphs of the compound. Examples of compounds that may be included in a drug formulation include the drug, preservatives, buffers, surfactants, and other excipients (e.g., ingredients) of the formulation.

Reservoir-based drug delivery devices may exhibit deviations from intended behavior as a result of interactions with the drug formulation. Drug formulation dependent failure mechanisms in reservoir-based drug delivery devices typically result from adopting existing drug formulations that were not intended or 'designed' for such delivery systems.

Designing drug formulations specifically for use in reservoir based external or implanted drug delivery devices could improve compatibility and significantly reduce costs associated with research and development and formulation dependent failure mechanisms.

In most cases, the reservoir-based delivery device components for which drug formulation compatibility may be an issue are polymeric components. For example, silicone components may cause compatibility concerns with certain drug formulations.

The methods described herein may be used to formulate any suitable drug. Preferably the drug has a number-average molecular weight of less than 1000 Daltons.

The methods described herein provide guidance for selecting a suitable formulation pH and drug concentration for compatibility with a reservoir-based delivery device. To select a suitable pH and concentration, the following four factors may be considered:

Differential Hansen Solubility Parameter (HSP)—based on HSP values of drug contacting materials and formulation ingredients pH—solubility profile of drug Functional group—potential for chemical reaction between formulation ingredients and drug contacting materials Baseline reactivity of formulation medium without ingredient These factors are discussed in additional detail below.

HSP

Without intending to be bound by theory, it is believed that HSP provides a thermodynamic indication of whether a compound will migrate into a component of the reservoir-based delivery device, such as a polymeric component of the reservoir-based delivery device. Greater differences between HSPs of the compound and the component tend to result in lower amounts of migration.

For purposes of the present disclosure, differential HSP values of less than 7 are considered to be of high risk, HSP values between 7 and 10 are considered to be of medium risk, and HSP values of greater than 10 are considered to be of low risk for the drug to migrate into the component of the reservoir-based delivery device. Differential HSP values may be determined as described in Kitak, et al. (2015), "Determination of Solubility Parameters of Ibuprofen and Ibuprofen Lysinate," *Molecules*, 20:21549-21568. One useful measurement of differential HSP values is described in Equation (4) of Kitak, et al. on page 21550. Other useful measurements include Equations (5), (6), and (7) of Kitak, et al. on pages 21550-21551.

pH—Solubility Profile of Drug

Knowing the pH-solubility profile of an ingredient of a formulation, such as the drug, in a solution will be helpful to select a suitable the pH and concentration of the drug for use in the reservoir-based delivery device. For example, selecting a pH that has a higher maximum solubility concentration, allows the formulation to have a reasonably high concentration of the drug, even if the drug is substantially below the maximum solubility concentration at the chosen pH.

The further below formulation concentration is from the maximum solubility concentration at the chosen pH, the less is the potential for the drug to migrate into the component of the reservoir-based delivery device because equilibrium will drive the drug to remain in solution at lower concentrations.

Functional Groups—Chemical Reaction

The presence of certain functional groups on the drug or components of the formulation and certain functional groups on drug formulation contacting materials of the reservoir-based delivery devices may result in concern for chemical reaction between one or more ingredients of the formulation and the drug formulation contacting materials.

For example, silyl ether groups which may be present on silicone drug formulation contacting materials may react with amine groups, phosphate groups, or carboxylate groups of ingredients of the drug formulation.

If concerns exist regarding potential chemical reaction, the concentration of the ingredient in the formulation (relative to the solubility maximum) should be kept low.

Baseline Reactivity of Formulation Medium Without Drug

In some cases, concerns of reactivity between the formulation without the drug and the formulation-contacting surfaces of the reservoir-based delivery device may exist. For example, if the formulation contains components that may react with components of the reservoir-based delivery device at pH extremes, the pH extremes should be avoided.

With the above considerations in mind, reference is now made to FIG. 1, in which a flow diagram of a method employing these considerations is shown. In FIG. 1, reference is made to the drug. However, it will be understood that the method depicted in FIG. 1 may be applied to any ingredient of the drug formulation.

First, the HSP differential between the drug and one or more components of the reservoir-based delivery device is determined (100). If the HSP value is greater than 10 (110), the formulation may be prepared at the preferred pH (120). If the HSP value is less than 10 (110), the formulation should be prepared at a pH at which the drug is more soluble (130). The concentration of the drug should be below the concentration of maximum solubility at the chosen pH (140). The lower the HSP value, the lower the concentration. If there is potential for chemical reaction (150), consideration should be given to further reduce the concentration of the drug (160).

While not shown in FIG. 1, it will be understood that extremes of formulation pH that may cause compatibility issues should be avoided.

While the disclosure above relates mainly to compatibility of drug formulations with reservoir-based delivery devices, the concepts described herein may be used to determine compatibility of a drug formulation with a drug contacting material of any suitable medical device. Suitable medical devices include implantable infusion devices, ambulatory infusion devices, external infusion devices, catheters, syringes, and the like. Suitable infusion devices may comprise any suitable infusion mechanism, such as an osmotic pump, a peristaltic pump, a piston pump, propellant pump, and the like.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

EXAMPLE

In the following, non-limiting example development of a bupivacaine formulation for use in a reservoir-based delivery device is shown. The drug delivery device for which compatibility was determined was Medtronic, Inc.'s SynchroMed® II implantable infusion device. The material of the component of the SynchroMed® II for which compatibility was tested was silicone. Bupivacaine may migrate into silicone without consideration of formulation.

The chemical structure of bupivacaine is provided below:

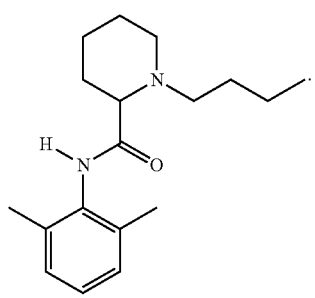

(I)

The HSP of bupivacaine and the drug contacting material (silicone) were determined. Results as shown below in Table 1.

TABLE 1

Hansen Solubility Parameters (HSP) of
Bupivacaine & Drug contacting material

| HSP | δD | δP | δH |
|---|---|---|---|
| bupivacaine | 18.1 | 6.46 | 6.03 |
| material | 16.6 | 2.54 | 5.78 |

The differential HSP value was determined to be 4.2, which is considered to be high risk of the drug migrating into the drug-contacting material.

In addition, it was determined that bupivacaine has a high risk of potential for chemical reaction between functional groups in bupivacaine and the functional groups in the drug-contacting material.

Further, the formulation reacts with the drug-contacting material at low pH, such as a pH of about 3.

Figure 2:
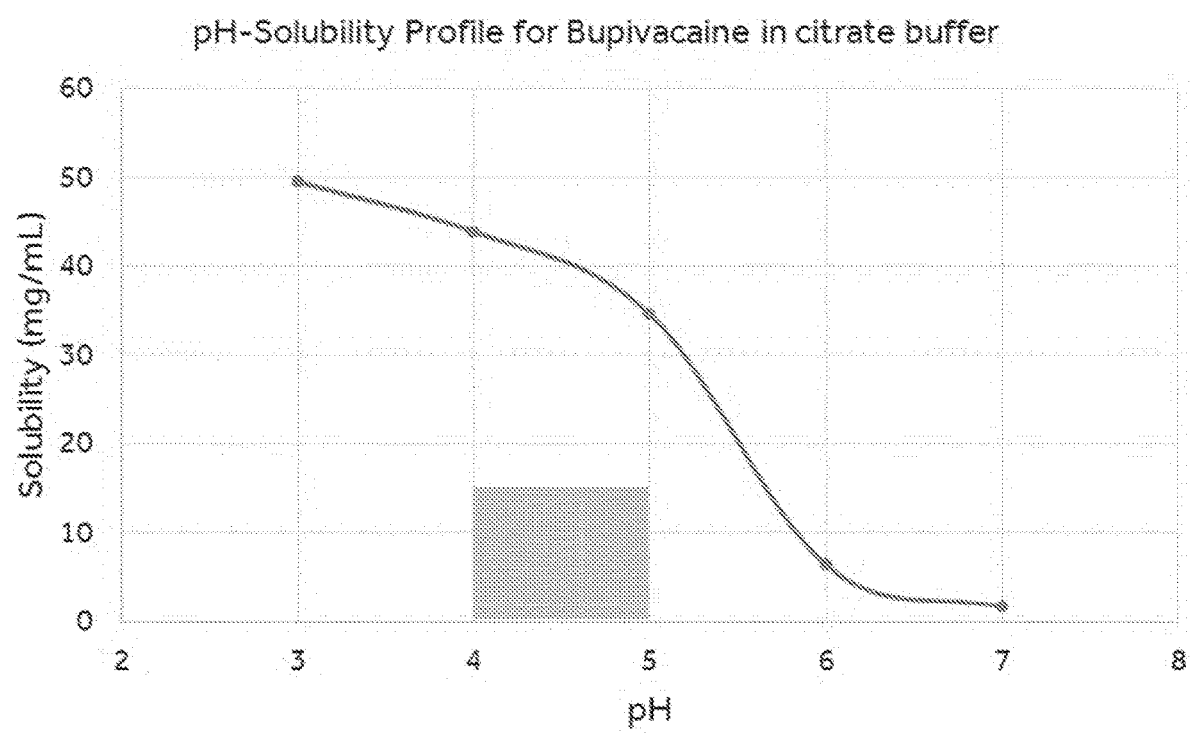
FIG. 2 is a graph of the pH-solubility profile for bupivacaine in citrate buffer.

The pH-solubility profile of bupivacaine in citrate buffer is shown in FIG. 2.

Based on the pH-solubility profile and the potential adverse device compatibility issues at low pH, a pH range of between 4 and 5 was considered suitable for the bupivacaine formulation for use with the delivery device. Given the previously mentioned considerations, a maximum concentration of bupivacaine of 15 mg/ml was determined to be suitable (see grey box in FIG. 2). Such a maximum concentration is substantially below the concentration of maximum solubility at the pH range of 4 to 5.

It will be understood that above-described process for development of a bupivacaine formulation is presented as an example of how the processes described herein may be employed to achieve compatibility between any suitable drug formulation and a reservoir-based delivery device.

What is claimed is:

1. A method comprising:
   determining a first Hansen Solubility Parameter (HSP) value for an ingredient of a formulation;
   determining a second HSP value for a component of a reservoir-based drug delivery device;
   determining a differential HSP value comprising a difference between the first HSP value and the second HSP value;
   identifying a range of pH at which the ingredient is soluble in an aqueous solution;
   comparing the differential HSP value to a threshold at which the ingredient migrates into the component;
   upon determining that the differential HSP value is below the threshold, reducing a concentration of the ingredient in the formulation below a maximum concentration, the reduction below the maximum being in proportion to the differential HSP value;
   preparing an aqueous drug formulation comprising the ingredient at the reduced concentration,
   wherein the prepared formulation has a pH within the identified range, and
   wherein the reduced concentration is below the maximum concentration for solubility of the ingredient at the pH of the prepared formulation.

2. The method of claim 1, wherein the concentration of the ingredient in the formulation is less than 50% of the maximum concentration for solubility at the pH of the formulation.

3. The method of claim 1, wherein the concentration of the ingredient in the formulation is less than 25% of the maximum concentration for solubility at the pH of the formulation.

4. The method of claim 1, further comprising determining whether the ingredient comprises a functional group that is reactive with the component of the reservoir-based drug delivery device.

5. The method of claim 4, further comprising lowering the concentration of the ingredient in the formulation based on determining the reactive functional group.

6. The method of claim 2, further comprising determining whether the ingredient comprises a functional group that is reactive with the component of the reservoir-based drug delivery device.

7. The method of claim 6, further comprising lowering the concentration of the ingredient in the formulation based on determining the reactive functional group.

8. The method of claim 3, further comprising determining whether the ingredient comprises a functional group that is reactive with the component of the reservoir-based drug delivery device.

9. The method of claim 8, further comprising lowering the concentration of the ingredient in the formulation based on determining the reactive functional group.

10. The method of claim 1, wherein the prepared formulation comprises a liquid bupivacaine formulation.

11. The method of claim 10, wherein the liquid bupivacaine formulation comprises water and bupivacaine at a concentration between 1 mg/ml and 15 mg/ml.

12. The method of claim 11, wherein the pH of the formulation is between 4 and 5.

13. The method of claim 10, further comprising disposing the liquid bupivacaine formulation in a reservoir of the reservoir-based drug delivery device.

14. The method of claim 1, wherein the reduced concentration is substantially below the maximum concentration for solubility at the selected pH.

15. The method of claim 1, wherein the reservoir-based drug delivery device comprises an implantable infusion device.

16. A method of providing a drug formulation for an implantable medical device, comprising:
   determining a first Hansen Solubility Parameter (HSP) value for an ingredient of a formulation;
   determining a second HSP value for a component of a reservoir-based drug delivery device;
   determining a differential HSP value comprising a difference between the first HSP value and the second HSP value;

determining that the differential HSP value is below a threshold at which the ingredient migrates into the component;

determining a pH-solubility profile for the ingredient in an aqueous solution;

selecting a concentration of the ingredient in the formulation that is below a maximum concentration according to the pH-solubility profile, wherein the selected concentration relative to the maximum concentration is proportional to the differential HSP value;

preparing an aqueous drug formulation comprising the ingredient at the selected concentration; and disposing the prepared formulation in a reservoir of the reservoir-based drug delivery device.

17. The method of claim 16, wherein the prepared formulation comprises a liquid bupivacaine formulation.

18. The method of claim 17, wherein the medical device comprises an implantable infusion device.

* * * * *